United States Patent
Jeong et al.

(10) Patent No.: US 9,416,830 B2
(45) Date of Patent: Aug. 16, 2016

(54) MOTOR-DRIVEN BRAKE HAVING MULTI-PAD

(71) Applicant: Hyundai Motor Company, Seoul (KR)

(72) Inventors: Jong Yun Jeong, Hwaseongi-si (KR); Dong Yoon Hyun, Seoul (KR)

(73) Assignee: Hyundai Motor Company, Seoul (KR)

( * ) Notice: Subject to any disclaimer, the term of this patent is extended or adjusted under 35 U.S.C. 154(b) by 167 days.

(21) Appl. No.: 14/280,105

(22) Filed: May 16, 2014

(65) Prior Publication Data

US 2015/0136536 A1    May 21, 2015

(30) Foreign Application Priority Data

Nov. 20, 2013  (KR) .......................... 10-2013-0141178

(51) Int. Cl.
| | | |
|---|---|---|
| *F16D 55/08* | (2006.01) | |
| *F16D 55/24* | (2006.01) | |
| *F16D 65/00* | (2006.01) | |
| *F16D 55/224* | (2006.01) | |
| *F16D 121/24* | (2012.01) | |

(52) U.S. Cl.
CPC ............ *F16D 55/24* (2013.01); *F16D 55/2245* (2013.01); *F16D 65/0068* (2013.01); *F16D 2121/24* (2013.01)

(58) Field of Classification Search
CPC ..... F16D 55/2245; F16D 55/24; F16D 55/31; F16D 65/18; F16D 2125/64; F16D 2125/645; F16D 2125/68; F16D 2125/24
See application file for complete search history.

(56) References Cited

U.S. PATENT DOCUMENTS

| | | | |
|---|---|---|---|
| 2,976,956 A | * | 3/1961 | Behles .................... F16D 55/46 188/152 |
| 4,842,102 A | | 6/1989 | Tateyama et al. |
| 6,588,550 B1 | * | 7/2003 | Olde Heuvel ............ B62L 1/14 188/24.22 |
| 2004/0159503 A1 | * | 8/2004 | Juan ...................... B60T 11/046 188/24.11 |
| 2005/0139435 A1 | | 6/2005 | Jelley et al. |

FOREIGN PATENT DOCUMENTS

| | | | |
|---|---|---|---|
| DE | 102006039970 A1 * | 2/2008 | ............ F16D 65/095 |
| JP | 10-331876 A | 12/1998 | |
| JP | 2009-68622 A | 4/2009 | |
| JP | 2011-953 A | 1/2011 | |
| JP | 4921296 B2 | 2/2012 | |

(Continued)

OTHER PUBLICATIONS

Machine translation of KR 1020050119382 (no date).*

(Continued)

*Primary Examiner* — Nicholas J Lane
(74) *Attorney, Agent, or Firm* — Morgan, Lewis & Bockius LLP

(57) ABSTRACT

An actuator-driven brake having a multi-pad, may include a torque member, a spindle that may be operated by a driving force from an actuator, a disc pressing assembly that may be pivotally coupled to the torque member and includes an outside lever and an inside lever, wherein each one end of the outside lever and the inside lever may be connected to the spindle and wherein the outside lever and the inside lever simultaneously press both sides of a brake disc by coming closer to each other when the spindle rotates, and a brake pad assembly that includes an outside pad attached to an inner side of the outside lever and an inside pad attached to an inner side of the inside lever.

18 Claims, 10 Drawing Sheets

VIEW A'-A'

(56) References Cited

FOREIGN PATENT DOCUMENTS

| KR | 10-2005-0119382 A | 12/2005 |
|---|---|---|
| KR | 10-0837974 B1 | 6/2008 |

OTHER PUBLICATIONS

Machine translation of JP 10-331876 (no date).*
Machine translation of KR 100837974 (no date).*
Machine translation of DE 10 2006 036 970 (no date).*

* cited by examiner

VIEW A'-A'

Cross-section of A-A

VIEW C'-C'

Cross-section of C-C

Cross-section of D-D

MOTOR-DRIVEN BRAKE HAVING MULTI-PAD

CROSS-REFERENCE TO RELATED APPLICATION

The present application claims priority to Korean Patent Application No. 10-2013-0141178 filed Nov. 20, 2013, the entire contents of which is incorporated herein for all purposes by this reference.

BACKGROUND OF THE INVENTION

1. Field of the Invention

The present invention relates to a motor-driven brake having a multi-pad, and more particularly, to a motor-driven brake having a multi-pad for obtaining a desired large braking force from a motor operation force that is small relatively to the related art.

2. Description of Related Art

Motor-driven brakes are used as the next generation brakes for the combi-brake system and the brake by wire system (BBW) of vehicles, because they have a rapid response speed and can be precisely controlled, relatively to hydraulic brakes.

The combi-brake system, a system using hydraulic brakes for front wheels and motor-driven brakes for rear wheels, has the advantage that the structure is simple with improved braking force and response and the braking force is easy to control, relatively to the existing hydraulic systems.

The brake by wire system (BBW), a system using motor-driven brakes mounted on all of front wheels and rear wheels, has the advantage that it can reduce a braking distance and increase stability in braking because it can independently and precisely control braking forces for the wheels and easily control the braking forces relatively to hydraulic types.

However, motor-driven brakes of the relate art which are used in those systems have a limit that they need large motor torque being in proportion to a braking force to generate a large braking force, and accordingly, the output and size of motors should be increased. Therefore, there is a problem in that they are disadvantageous in terms of cost and package and disadvantageous in terms of weight too because the motors should be increased in size due to the increase in required braking force.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an actuator-driven brake having a multi-pad which can generate a desired large braking force, using an actuator operation force that is small relatively to the related art.

In an aspect of the present invention, an actuator-driven brake having a multi-pad, may include a torque member, a spindle that is operated by a driving force from an actuator, a disc pressing assembly that is pivotally coupled to the torque member and may include an outside lever and an inside lever, wherein each one end of the outside lever and the inside lever is connected to the spindle and wherein the outside lever and the inside lever simultaneously press both sides of a brake disc by coming closer to each other when the spindle rotates, and a brake pad assembly that may include an outside pad attached to an inner side of the outside lever and an inside pad attached to an inner side of the inside lever.

The outside lever and the inside lever extend circumferentially around the brake disc and may have a stepped structure, crossing each other at sides of steps, and a cross portion where the levers cross each other is surrounded and supported by a central support of the torque member.

With respect to a cross portion where the outside and inside levers cross each other, a first outside pad and a second outside pad are rotatably disposed at left and right sides of the outside lever, and a first inside pad and a second inside pad are rotatably disposed at left and right sides of the inside lever.

The disc pressing assembly may include an adapter supporting the spindle rotatably on any one of the outside lever and the inside lever.

Lever supports that move along movement path grooves formed on the torque member, with ends of the lever supports in the movement path grooves, are formed on the outside lever and the inside lever.

Lever return springs are disposed between the outside lever and the inside lever and return the outside lever and the inside lever that may have come closer to each other.

In another aspect of the present invention, an actuator-driven brake having a multi-pad, may include a torque member, a spindle that is operated by a driving force from an actuator, a disc pressing assembly that is pivotally coupled to the torque member and may include an outside lever and an inside lever, wherein each one end of the outside lever and the inside lever is connected to the spindle and wherein the outside lever and the inside lever simultaneously press both sides of a brake disc by coming closer to each other when the spindle rotates, and a brake pad assembly that may include an outside pad disposed between the outside lever and the brake disc and an inside pad disposed between the inside lever and the brake disc, the outside pad and the inside pad being respectively seated in a plurality of pad seat formed on the torque member.

The outside lever and the inside lever extend circumferentially around the brake disc and may have a stepped structure, crossing each other at sides of steps thereof, and a cross portion where the outside and inside levers cross each other is surrounded and supported by a central support of the torque member.

A first outside pad contact part and a second outside pad contact part are assembled to be movable to the left and right, at left and right sides of the outside lever, the first outside pad contact part is close to a rear side of the first outside pad, and the second outside pad contact part is close to a rear side of the first outside pad.

A first inside pad contact part and a second inside pad contact part are assembled to be movable to the left and right, at left and right sides of the inside lever, the first inside pad contact part is close to a rear side of the first inside pad, and the second inside pad contact part is close to a rear side of the first inside pad.

The outside pad may include a first outside pad and a second outside pad connected to left and right sides of the outside lever, respectively, the inside pad may include a first inside pad and a second inside pad connected to left and right sides of the inside lever, respectively, the first outside pad and inside pad and the second outside pad and inside pad are arranged opposite each other, respectively, with the brake disc therebetween.

The disc pressing assembly may include an adapter supporting the spindle rotatably on any one of the outside lever and the inside lever.

Lever supports that move along movement path grooves formed on the torque member, with ends of the lever supports in the movement path grooves, are formed on the outside lever and the inside lever.

Lever return springs are disposed between the outside lever and the inside lever and return the outside lever and the inside lever that may have come closer to each other.

In the outside lever, an outside bearing supporting left and right movement of the outside pad contact part is disposed between the outside lever and the outside pad contact part.

In the inside lever, an inside bearing supporting left and right movement of the inside pad contact part is disposed between the inside lever and the inside pad contact part.

In the outside lever, a pad contact return spring that returns the outside pad contact part that may have moved straight is disposed between the outside lever and the outside pad contact part.

In the inside lever, a pad contact return spring that returns the inside pad contact part that may have moved straight is disposed between the inside lever and the inside pad contact part.

A rear side of the outside pad is concave, front sides of the pad contact parts facing the outside pad are convex, and a curvature of the rear side of the outside pad is smaller than a curvatures of the front sides of the pad contact parts assembled with the outside lever.

A rear side of the inside pad is concave, front sides of the pad contact parts facing the inside pad are convex, and a curvature of the rear side of the inside pad is smaller than a curvature of the front sides of the pad contact parts assembled with the inside lever.

In another aspect of the present invention, the motor-driven brake having a multi-pad according to the present invention is advantageous in reduction of weight and layer because it is possible to reduce the size of the motor in comparison to the existing motor-driven brakes, and in fuel efficiency because power consumption is small.

Further, the motor-driven brake having a multi-pad according to the present invention is advantageous in heat dissipation of pads because a plurality of friction pads is used, such that it is possible to stably generate a braking force.

The methods and apparatuses of the present invention have other features and advantages which will be apparent from or are set forth in more detail in the accompanying drawings, which are incorporated herein, and the following Detailed Description, which together serve to explain certain principles of the present invention.

The above and other features of the invention are discussed infra.

Figure 1A:
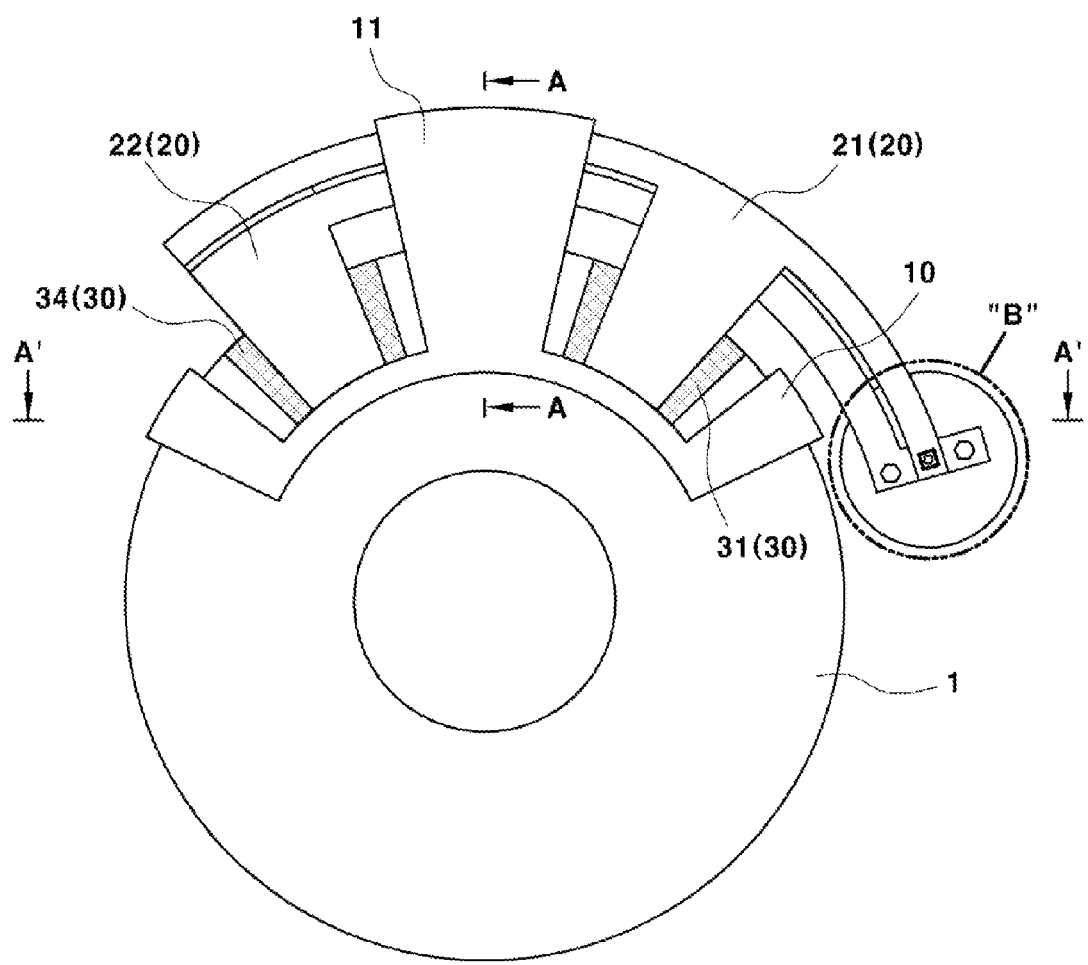
FIG. 1A is a view showing a motor-driven brake having a multi-pad according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, preferred embodiments of the present invention will be described more fully with reference to the accompanying drawings for those skilled in the art to easily implement the present invention.

The present invention relates to a motor-driven brake having a multi-pad which is mounted on a wheel of a vehicle and brakes by reducing rotation of a brake disc rotating with the wheel and is characterized in that it can generate a necessary large braking force, using a motor operation force that is small relatively to the motor drive brakes of the related art.

Figure 1B:
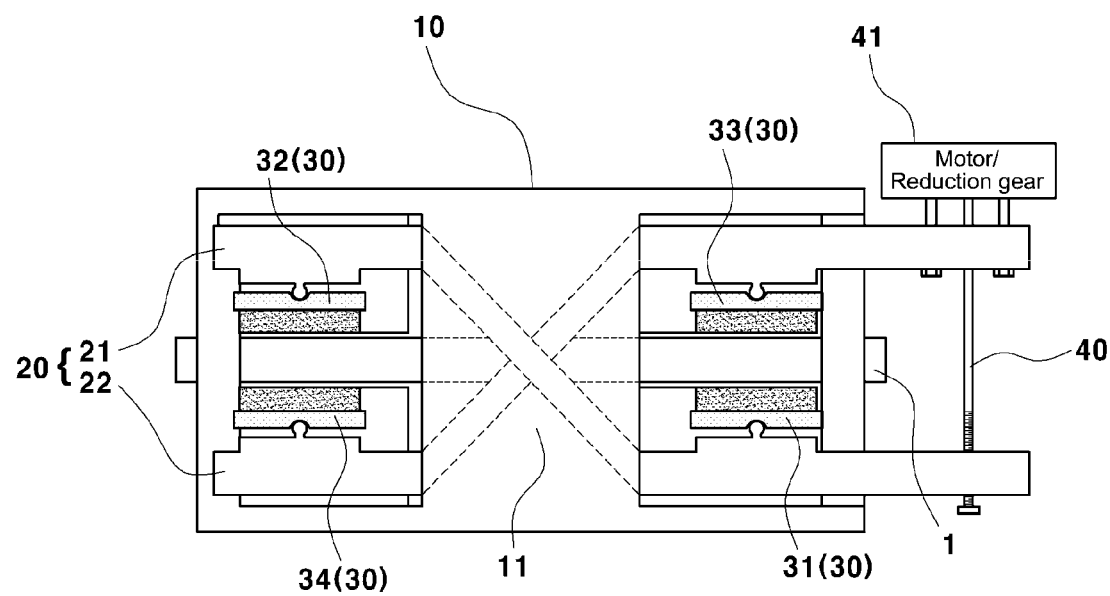
FIG. 1B is a view taken along line A'-A' of FIG. 1A.

As shown in FIGS. 1A and 1B, a motor-driven brake having a multi-pad according to an exemplary embodiment of the present invention includes a torque member 10 coupled to a car body, a disc pressing assembly 20 supported by the torque member 10 and partially covering both sides of the brake disc 1, a brake pad assembly 30 disposed inside the disc pressing assembly 20 and facing both sides of the brake disc 1, and a spindle 40 transmitting a driving force from a motor to the disc pressing assembly 20.

The torque member 10, which is coupled to a car body and covers a circumferentially predetermined portion of the brake disc 1, supports the disc pressing assembly 20 to the car body, in detail, has a structure that can hold an outside lever 21 and an inside lever 22 of the disc pressing assembly 20 and a central support 11 supporting the cross portion of the levers 21 and 22.

Figure 2:
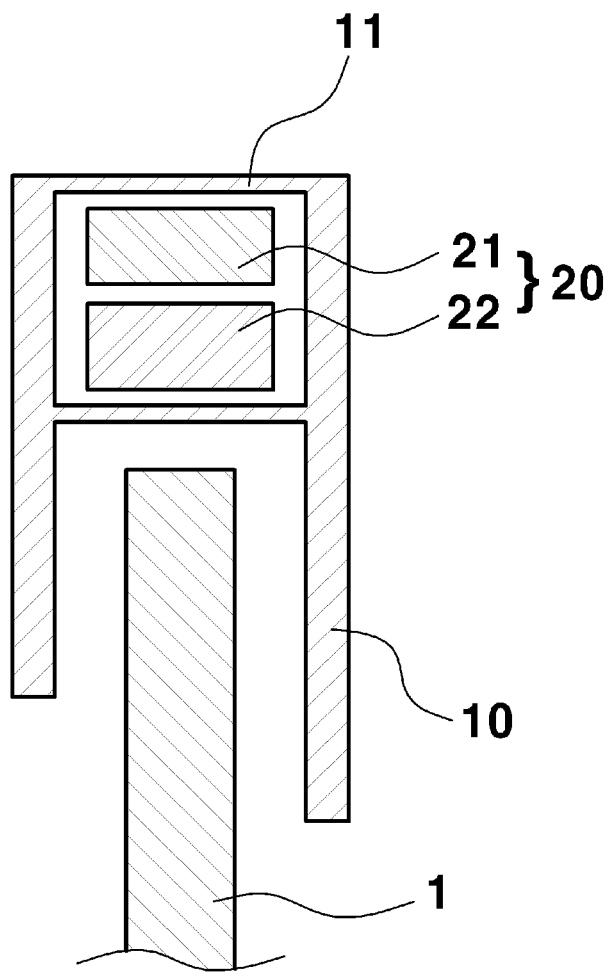
FIG. 2 is a cross-sectional view taken along line A-A of FIG. 1.

As shown in FIG. 2, the central support 11 is disposed at the center portion of the torque member 10, covering the cross portion of the disc pressing assembly 20 operating in leverage, and supports the operation of the disc pressing assembly 20.

The disc pressing assembly 20 includes, as described above, the outside lever 21 and the inside lever 22, and as shown in FIG. 1B, the levers 21 and 22 are arranged opposite each other with the brake disc 1 therebetween.

The outside lever 21 and the inside lever 22 extends along a predetermined circumferential section of the brake disc 1 and are stepped in two-step structures, crossing each other at the sides with the steps. The cross portion where the levers 21 and 22 cross each other is supported by the central support 11 of the torque member 10.

The brake pad assembly 30 including the outside pads 31 and 32 and the inside pads 33 and 34 is disposed inside the disc pressing assembly 20.

The outside pads 31 and 32 are a first outside pad 31 and a second outside pad 32, and attached to the inside of the outside lever 21, more specifically, at left and right sides from the step of the outside lever 21.

The inside pads 33 and 34 are a first inside pad 33 and a second inside pad 34, and attached to the inside of the outside lever 22, more specifically, at left and right sides from the step of the inside lever 22.

The outside pads 31 and 32 and the inside pads 33 and 34 are rotatably disposed inside the outside lever 21 and the inside lever 22.

That is, the outside pads 31 and 32 and the inside pads 33 and 34 are disposed at the left and right sides of the levers 21 and 22, from the cross portion of the outside lever 21 and the inside lever 22, and as shown in FIGS. 1A and 1B, the first outside pad 31 and first inside pad 33 and the second outside pad 32 and second inside pad 34 are disposed opposite each other, respectively, with the disc brake 1 therebetween.

The pads 31~34 of the brake pad assembly 30, which are a kind of friction pads, have a friction member on the sides facing the brake disc 1 and the friction member can reduce the rotational force of the brake disc 1, using a friction force, when coming in contact with the brake disc 1.

The outside lever 21 and the inside lever 22 are assembled with predetermined ends connected by the spindle 40 that is operated by the driving force from a motor 41.

The spindle 40 is disposed through the ends of the outside lever 21 and the inside lever 22, with one end thread-fastened to any one of the levers 21 and 22 and another end connected to the rotary shaft of the motor 41 through another lever.

The motor 41 is fixed to a side of the lever 21 or 22 through which another end of the spindle 40 passes.

Accordingly, as the motor 41 operates and the spindle 40 rotates with the motor shaft, any one of the levers 21 and 22 moves to the brake disc 1 along the thread on the spindle 40.

Accordingly, as the spindle 40 rotates, the levers 21 and 22 come closer to each other, such that they simultaneously press both sides of the brake disc 1.

Figure 3:
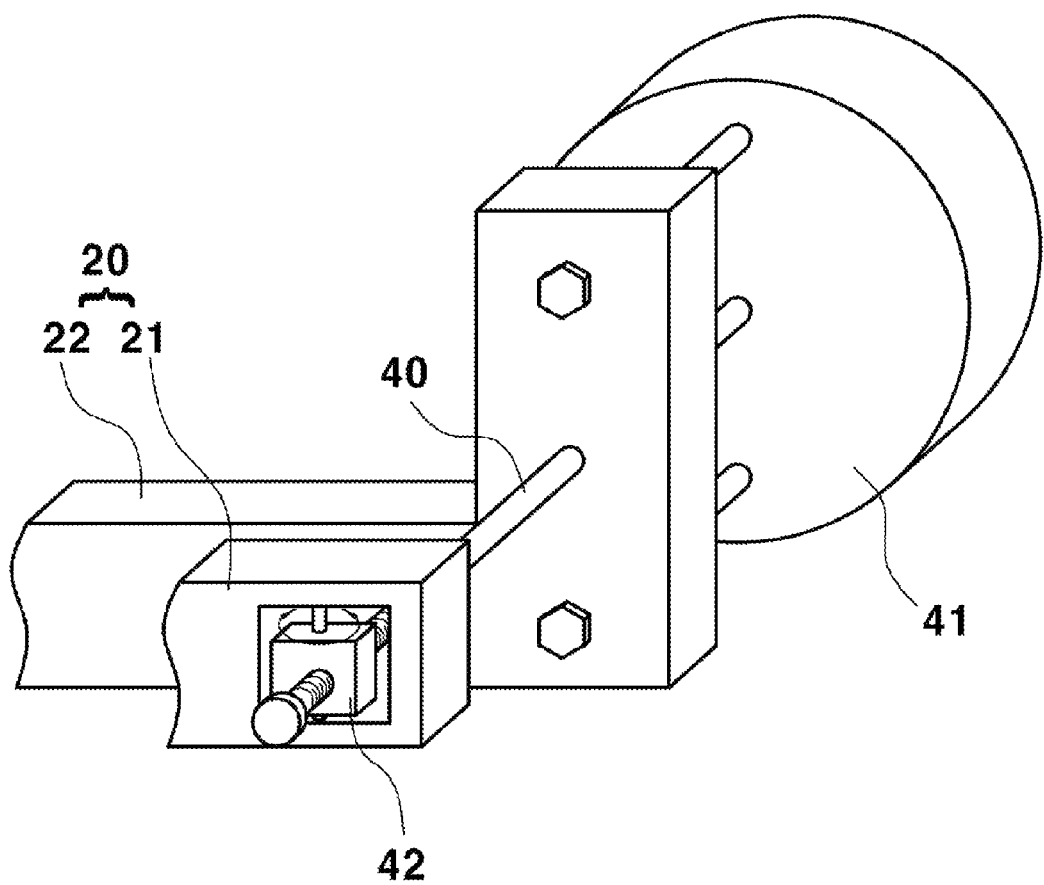
FIG. 3 is an enlarged view of the portion B in FIG. 1.
Figure 4:
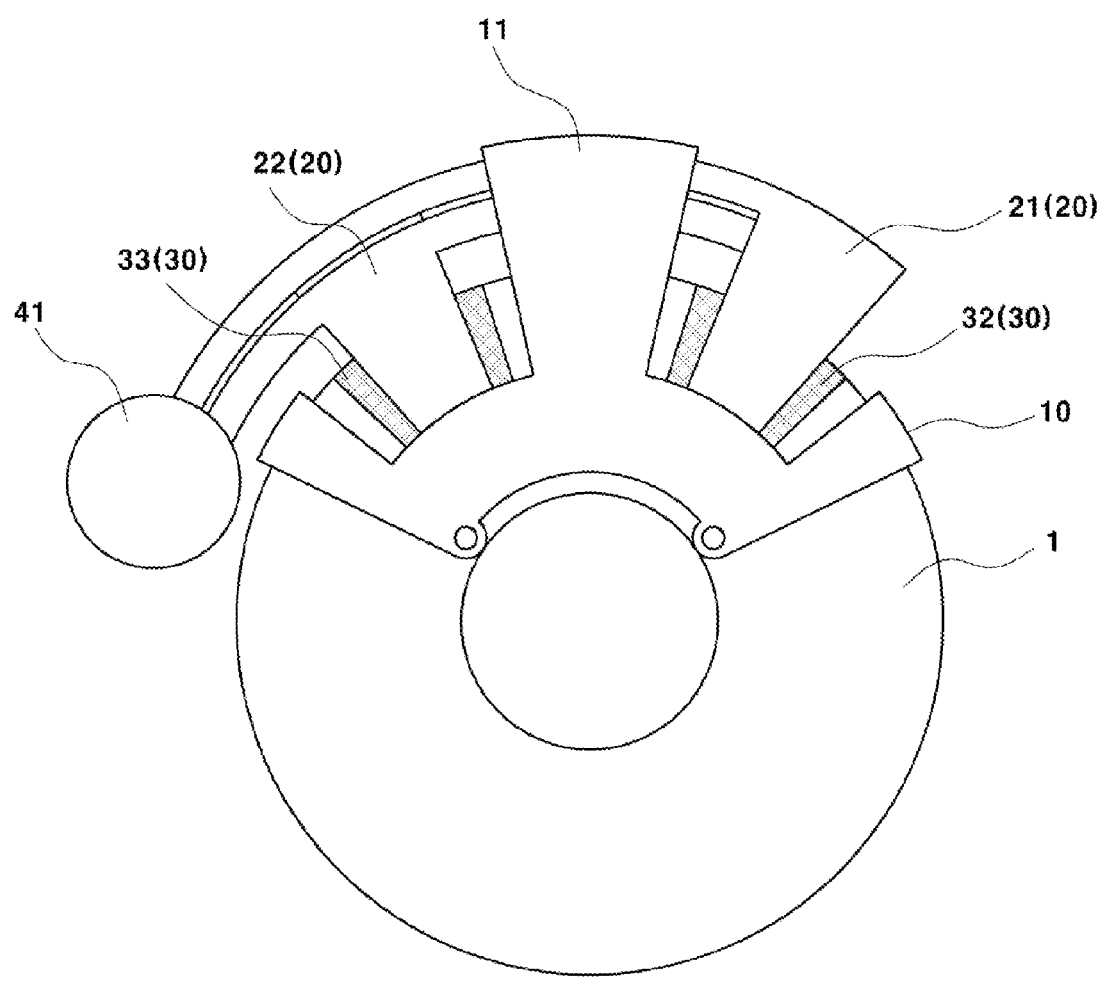
FIG. 4 is a rear view showing the motor-driven brake having a multi-pad according to an exemplary embodiment of the present invention.

Further, the spindle 40 is coupled to the end of the lever 21 by an adapter 42, as shown in FIG. 3.

The adapter 42 is thread-fastened to the end of the spindle 40 and rotatably coupled to any one of the levers 21 and 22, such that any one of the levers moves to the brake and the adapter 42 rotates on the lever, when the spindle 40 rotates. Accordingly, bending of the spindle 40 due to the movement of the lever can be prevented.

That is, the adapter 42 supports the spindle 40 rotatably on any one of the levers 21 and 22, and for reference, the adapter 42 is coupled to one end of the outside lever 21 in this embodiment.

The operation of the motor-driven brake having a multi-pad which has the configuration described above is described hereafter.

Figure 5:
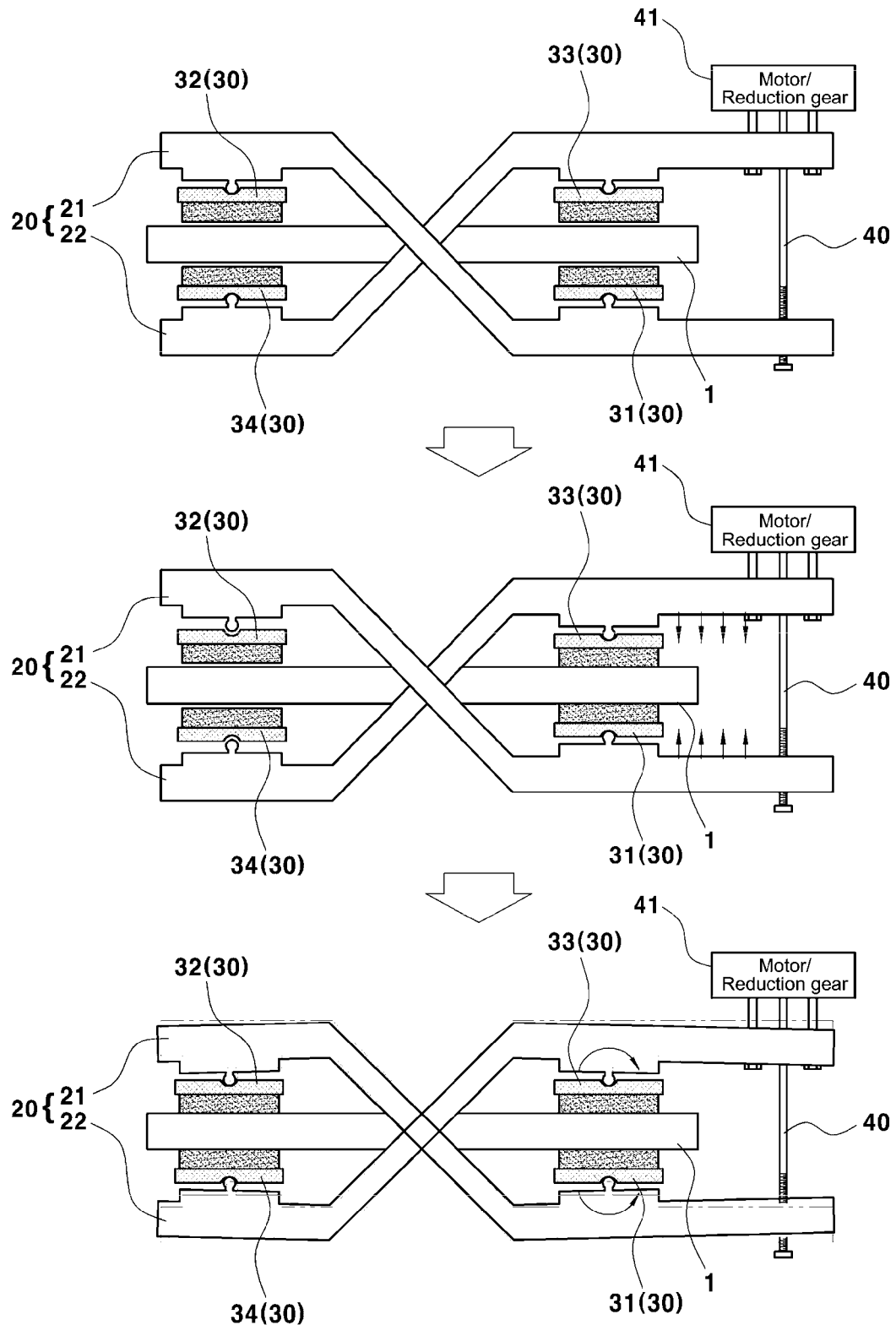
FIG. 5 is a view showing the operation of the motor-driven brake having a multi-pad according to an exemplary embodiment of the present invention.

Referring to FIG. 5, as the motor 41 starts operating and the motor shaft rotates forward, the spindle 40 connected to the motor shaft rotates in one direction, and the outside lever 21 is moved to the brake disc 1 along the thread on the spindle 40 by the adapter 42 connected with the spindle 40 and the inside lever 22 is also moved to the brake disc 1, such that the levers 21 and 22 are pulled closer to each other.

When the first outside pad 31 and the first inside pad 33 come in contact with the brake disc 1, the levers starts rotating about the connection point between the levers 21 and 22 and the pads 31 and 33.

As the levers 21 and 22 start rotating, the second outside pad 32 and the second inside pad 34 come in contact with the brake disc 1, such that the pads 31, 32, 33, and 34 generate a braking force by pressing the brake disc 1.

Therefore, in addition to the braking forces by the supporting force at the first outside pad 31 and the first inside pad 33, a braking force is generated by the force transmitted to the second outside pad 32 and the second inside pad 34 due to leverage, so a desired large braking force can be achieved from the operation force of the motor which is small relatively to the related art.

FIGS. 6A to 10 are views illustrating the configuration and the operation of a motor-driven brake having a multi-pad according to another embodiment of the present invention.

Another embodiment of the present invention is described hereafter, and in the following description, additional and changed configurations in comparison to the previous embodiment are mainly described and the same configurations as those in the previous embodiment may not be described.

As shown in FIGS. 6A to 9, a motor-driven brake having a multi-pad according to another embodiment of the present invention, similar to the previous embodiment, includes a torque member 10 coupled to a car body, a disc pressing assembly 20 supported by the torque member 10 and partially covering both sides of the brake disc 1, a brake pad assembly 30 disposed close to the inner side of the disc pressing assembly 20 and facing both sides of the brake disc 1, and a spindle 40 transmitting a driving force from a motor 41 to the disc pressing assembly 20, in which the parts are arranged in a structure almost similar to that in the previous embodiment.

Figure 6A:
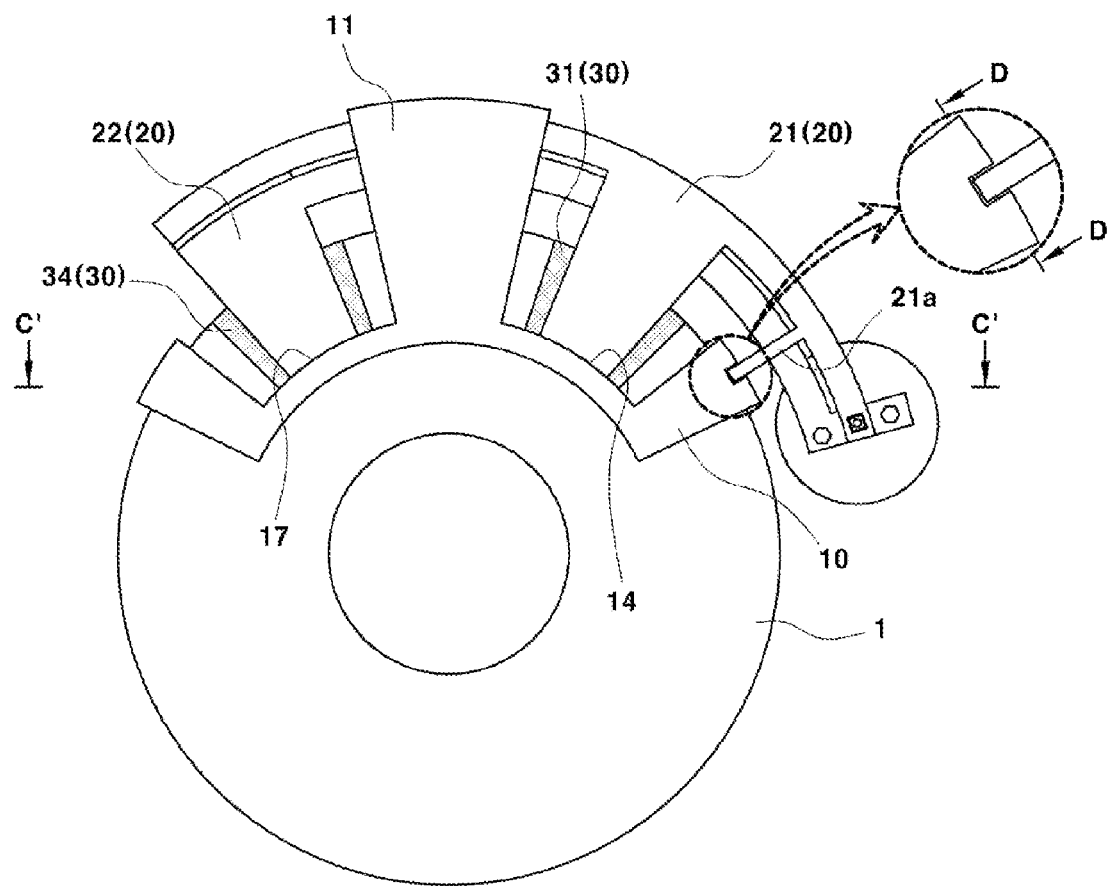
FIG. 6A is a view showing a motor-driven brake having a multi-pad according to another embodiment of the present invention.
Figure 6B:
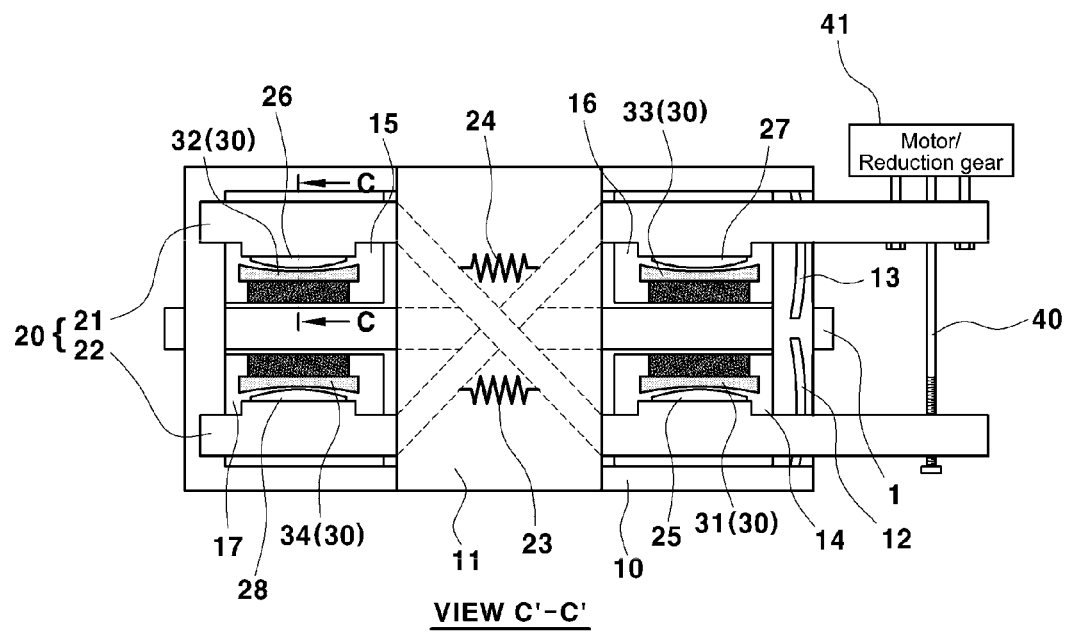
FIG. 6B is a view taken along line C'-C' of FIG. 6A.

As shown in FIGS. 6A and 6B, the disc pressing assembly 20 includes an outside lever 21 and an inside lever 22, and lever supports 21a and 22a are formed on the outside lever 21 and the inside lever 22, respectively.

The lever supports 21a and 22a protrude downward (that is, toward the torque member 10) from the lower ends of predetermined sides of the levers 21 and 22, with the ends in movement path grooves 12 and 13 formed at the upper ends of a side of the torque member 10.

Figure 7:
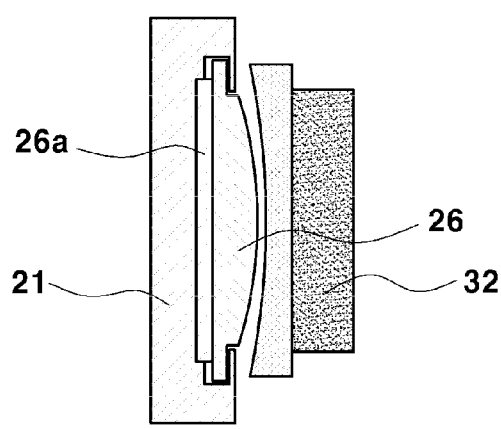
FIG. 7 shows cross-sectional views taken along line C-C and line D-D of FIG. 6.
Figure 7:
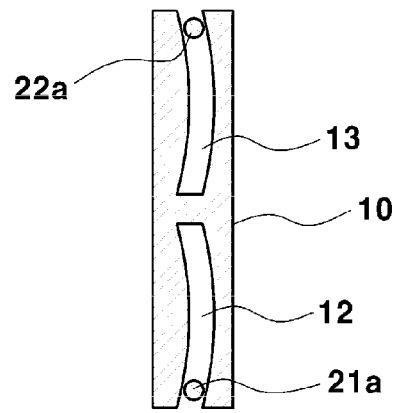

As shown in FIG. 7, the movement path grooves 12 and 13 are formed to guide the outside lever 21 and the inside lever 22, when the disc pressing assembly 20 operates.

Accordingly, the lever supports 21a and 22a on the sides of the outside lever 21 and the inside lever 22 move along the movement path grooves 12 and 13 of the torque member 10, with the ends in the movement path grooves 12 and 13, when the disc pressing assembly 20 operates.

Further, lever return springs 23 and 24 are disposed between the outside lever 21 and the inside lever 22.

The lever returns springs 23 and 24 are positioned such that they can generate an elastic return force while extending, as the outside lever 21 and the inside lever 22 come closer to each other, with the spindle 40 operating.

Referring to FIGS. 6B and 2, the outside lever 21 and the inside lever 22 are stepped, crossing each other at a side of the step (inside a central support 11), and arranged left and right close to each other with a predetermined gap at the cross portion, and the lever return springs 23 and 24 are disposed in the gap.

Accordingly, the lever return springs 23 and 24 generate elastic return forces which extending (see FIG. 10), as the outside lever 21 and the inside lever 22 come closer to each other with the spindle 40 operating, and when the spindle 40 stops (braking stops), the lever return springs return the outside lever 21 and the inside lever 22, using the elastic return forces.

Figure 9:
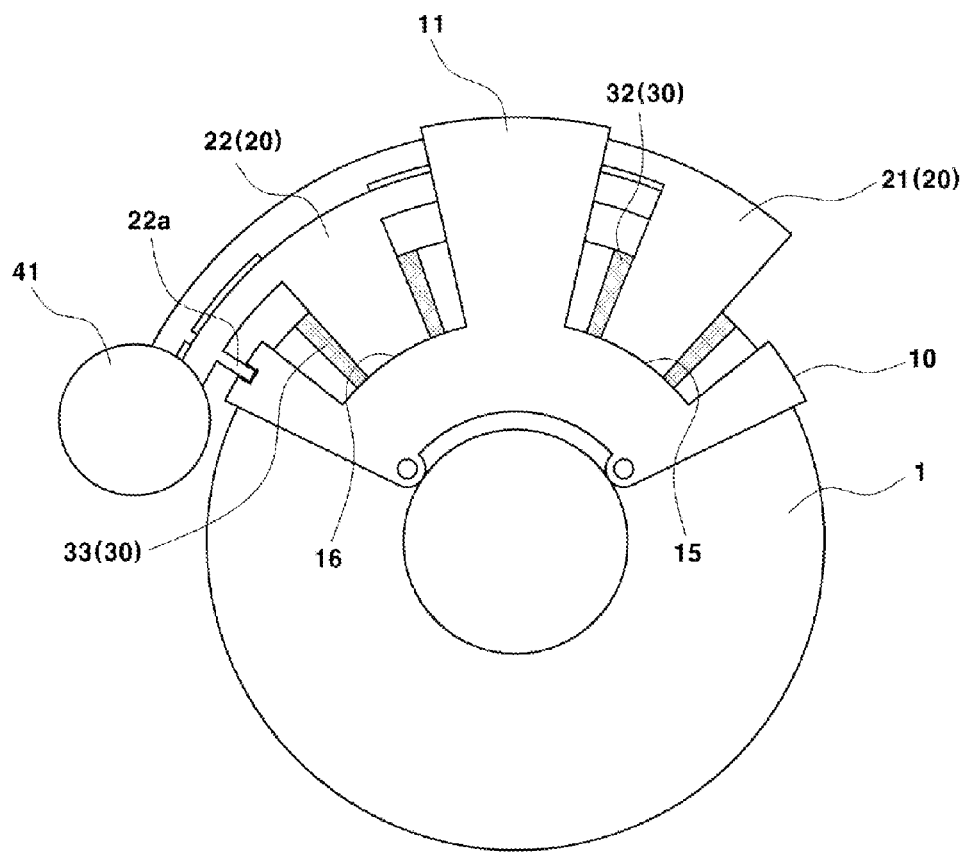
FIG. 9 is a rear view showing the motor-driven brake having a multi-pad according to the exemplary embodiment of the present invention.

Further, referring to FIGS. 6A, 6B, and 9, pad seats 14, 15, 16, and 17 for the outside pads 31 and 32 and the inside pads 33 and 34 are formed on the torque member 10, at the left and right sides from the central support 11.

The first outside pad 32, the first inside pad 33, the second outside pad 32, and the second inside pad 34 are inserted in the pad seats 1427 on the torque member 10.

In detail, the first outside pad 31 and the second inside pad 34 are seated in the first pad seat 14 and the fourth pad seat 17 of the torque member 10 which face the outer side of the brake disc 1, while the second outside pad 32 and the first inside pad 33 are seated in the second pad seat 15 and the third pad seat 16 of the torque member 10 which face the inner side of the brake disc 1.

Figure 8:
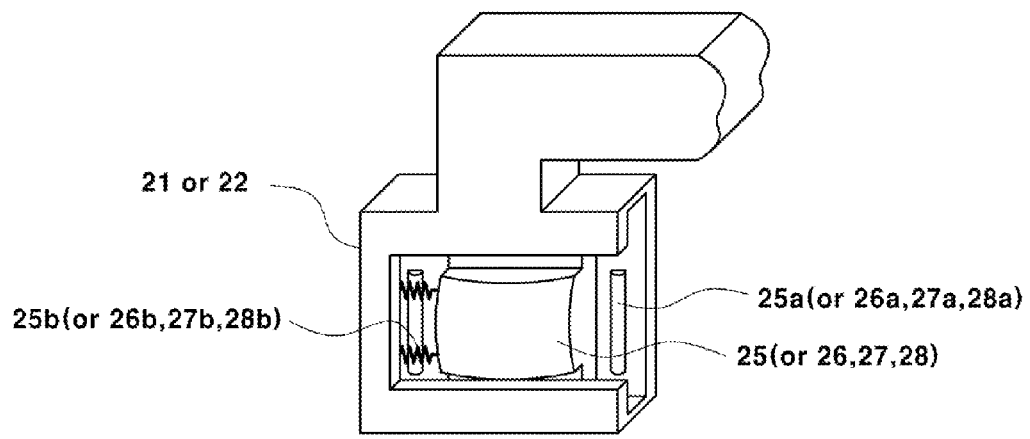
FIG. 8 is a partial perspective view showing the mounting structure of a pad contact part in the motor-driven brake having a multi-pad according to the exemplary embodiment of the present invention.

As shown in FIGS. 7 and 8, a first outside pad contact part 25 and a second outside pad contact part 26 are assembled with the outside lever 21 at the left and right sides to be movable to the left and right, and a first inside pat contact part 27 and a second inside contact part 28 are assembled with the inside lever 22 at the left and right side to be movable to the left and right.

The first outside pad contact part 25 is close to the rear side of the first outside pad 31, the second outside pad contact part 26 is close to the rear side of the second outside pad 32, the first inside pad contact part 27 is close to the rear side of the first inside pad 33, and the second inside pad contact part 28 is close to the rear side of the second inside pad 34.

As the outside lever 21 and the inside lever 22 are moved to the brake disc 1 by rotation of the spindle 40, the first outside pad contact part 25 and the second inside pad contact part 27 bring the first outside pad 31 and the first inside pad 33 in contact with the disc 1 by pushing them, respectively, in which the outside lever 21 and the inside lever 22 start rotating about the contact points between the pads 31 and 33 and the pat contact parts 25 and 27.

For not surface, but line contact of the rear sides of the pads 31 and 33 and the front sides of the pad contact parts 25 and 27, as shown in FIGS. 6B and 7, the rear sides of the first outside pad 31 and the first inside pad 33 are concave and the front sides of the first outside pad contact part 25 and the first inside pad contact part 27 which face the pads 31 and 33 are convex.

Similarly, the rear sides of the second outside pad 32 and the second inside pad 34 are concave and the front sides of the second outside pad contact part 26 and the second inside pad contact part 28 which ace the pads 33 and 34 are convex.

For the line contact, the curvatures of the outside pad contact parts 25 and 26 and the inside pad contact parts 27 and 28 are larger than the curvatures of the outside pads 31 and 32 and the inside pads 33 and 34.

Further, in order to bring the pad contact parts 25, 26, 27, and 28 in line contact with the centers of the rear sides of the pads 31, 32, 33, and 34 when the outside lever 21 and the inside lever 22 rotate, in other words, in order for the pad contact parts 25, 26, 27, and 28 move straight and keep in line contact with the centers of the rear sides of the pads 31, 32, 33, and 34, if necessary, as shown in FIGS. 7 and 8, bearings 25a, 26a, 27a, and 28a supporting left and right movement of the pad contact parts 25, 26, 27, and 28 assembled with the levers 21 and 22, respectively, are disposed on the outside lever 21 and the inside lever 22.

In detail, in the outside lever 21, the outside bearings 25a and 26a supporting left and right movement of the outside pad contact parts 25 and 26 are disposed between the outside lever 21 and the outside pat contact parts 25 and 26, and in the inside lever 22, the inside bearings 27a and 28a supporting left and right movement of the inside pad contact parts 27 and 28 are disposed between the inside lever 22 and the inside pad contact parts 27 and 28.

Accordingly, since the pad contact parts 25~28 keep line contact with the centers of the rear sides of the pads 31~34, the pads 31~34 press the disc 1 in close contact with it at the centers of the rear sides, such that the pressing efficiency increases.

Further, pad contact part return springs 25b, 26b, 27b, and 28b are mounted on the outside lever 21 and the inside lever 22 to return the contact parts 25, 26, 27, and 28 that have moved straight.

In detail, in the outside lever 21, the outside bearings 25b and 26b returning the outside pad contact parts 25 and 26 that have moved straight are disposed between the outside lever 21 and the outside pat contact parts 25 and 26, and in the inside lever 22, the inside bearings 27b and 28b returning the inside pad contact parts 27 and 28 that have moved straight are disposed between the inside lever 22 and the inside pad contact parts 27 and 28.

The operation of the motor-driven brake having a multi-pad according to this embodiment, which includes the configuration described above, is described hereafter.

Figure 10:
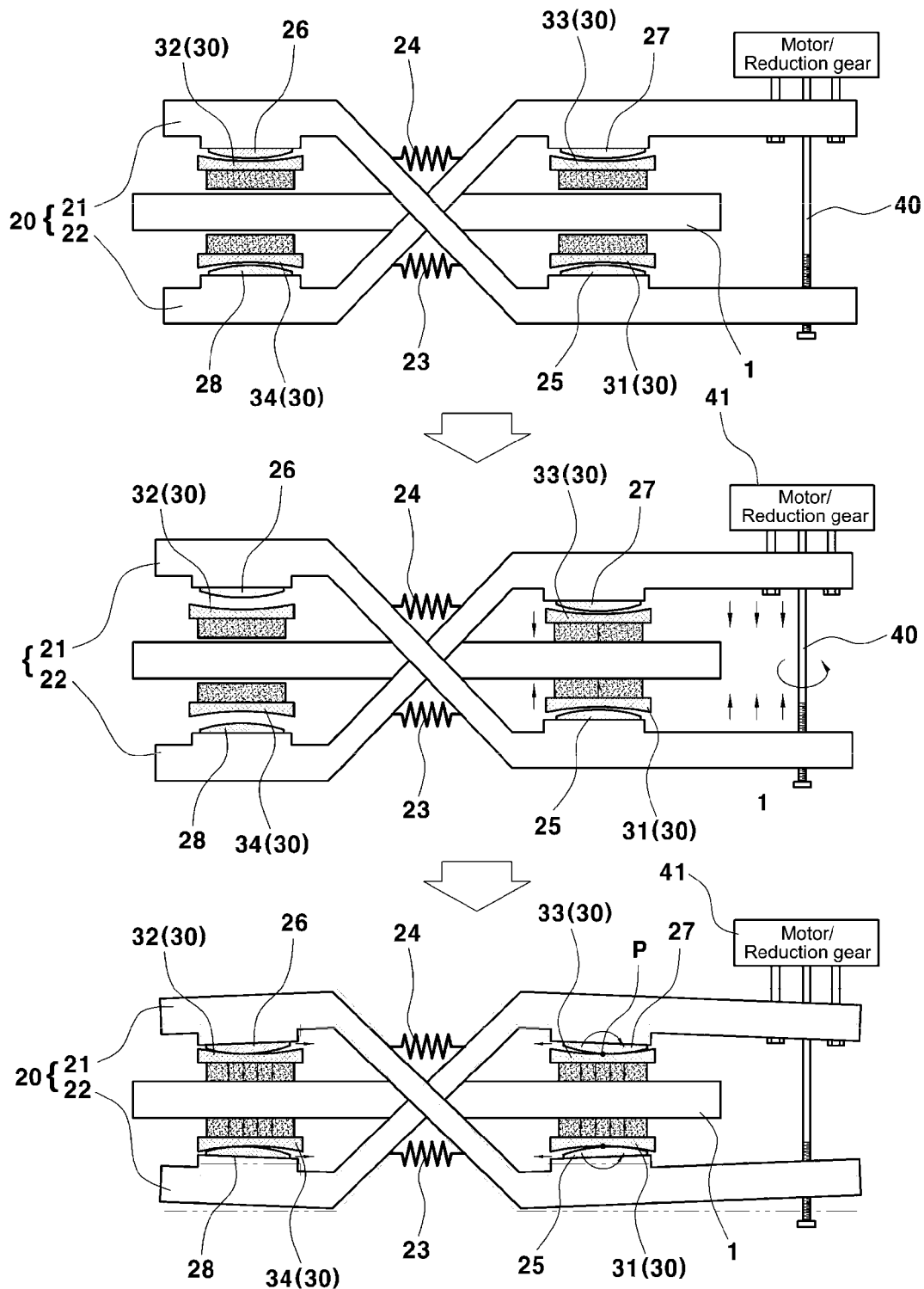
FIG. 10 is a view showing the operation of the motor-driven brake having a multi-pad according to the embodiment of the present invention.

Referring to FIG. 10, as the motor 41 starts operating and the motor shaft rotates forward, the spindle 40 connected to the motor shaft rotates in one direction, and the outside lever 21 is moved to the brake disc 1 along the thread on the spindle 40 by the adapter 42 connected with the spindle 40 and the inside lever 22 is also moved to the brake disc 1, such that the levers 21 and 22 are pulled closer to each other.

As the levers 21 and 22 come closer to each other, the first outside pad contact part 25 and the first inside pad contact part 27 push and bring the first outside pad 31 and the first inside pad 33 in close contact with the brake disc 1 and start rotating about (on) the contact points between the pad contact parts 25 and 27 and the pads 31 and 33.

As the levers 21 and 22 start rotating, the second outside pad 32 and the second inside pad 34 are pushed by the second outside pad contact part 26 and the second inside pad contact part 28, respectively, and brought in contact with the brake disc 1, such that the pads 31, 32, 33, and 34 generate a braking force by pressing the brake disc 1.

Therefore, in addition to the braking forces by the supporting force at the first outside pad 31 and the first inside pad 33, a braking force is generated by the force transmitted to the second outside pad 32 and the second inside pad 34 due to leverage, so a desired large braking force can be achieved from the operation force of the motor which is small relatively to the related art.

In this process, the second outside pad contact part 26 and the second inside pad contact part 28 come in line contact with the rear sides of the second outside pad 32 and the second inside pad 34, respectively, and keep in line contact with the centers of the rear sides of the pads 33 and 34 by the bearings 26a and 28a without straying out of the centers of the rear sides of the pads 33 and 34.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An actuator-driven brake having a multi-pad, comprising:
    a torque member;
    a spindle operated by a driving force from an actuator;
    a disc pressing assembly including an outside lever and an inside lever, wherein each one end of the outside lever and the inside lever is connected to the spindle and wherein the outside lever and the inside lever simultaneously press both sides of a brake disc by the spindle moving the outside lever and the inside lever closer to each other when the spindle rotates; and
    a brake pad assembly including at least two outside pads attached to an inner side of the outside lever and at least two inside pads attached to an inner side of the inside lever,
    wherein the outside lever and the inside lever extend circumferentially around the brake disc and the outside and inside levers are aligned to cross each other at a cross point thereof and to be decoupled from each other at the cross point, and
    wherein one outside pad of the at least two outside pads and one inside pad of the at least inside pads are adjacent to the spindle and is disposed between the cross point and the spindle such that, when the outside and inside levers move to the brake disc, the outside lever rotates around a first connection point of the outside lever and the one outside pad and the inside lever rotates around a second connection point of the inside lever and the one inside pad.

2. The actuator-driven brake having the multi-pad of claim 1, wherein with respect to the cross point, a first outside pad of the brake pad assembly and a second outside pad of the brake pad assembly are rotatably disposed at left and right sides of the outside lever, and a first inside pad of the brake pad assembly and a second inside pad of the brake pad assembly are rotatably disposed at left and right sides of the inside lever.

3. The actuator-driven brake having the multi-pad of claim 1, wherein the disc pressing assembly includes an adapter supporting the spindle rotatably on any one of the outside lever and the inside lever.

4. The actuator-driven brake having the multi-pad of claim 1, wherein lever supports moving along movement path grooves formed on the torque member, with ends of the lever supports in the movement path grooves, are formed on the outside lever and the inside lever.

5. The actuator-driven brake having the multi-pad of claim 1, wherein lever return springs are disposed between the outside lever and the inside lever and return the outside lever and the inside lever that have come closer to each other.

6. An actuator-driven brake having a multi-pad, comprising:
    a torque member;
    a spindle operated by a driving force from an actuator;
    a disc pressing assembly including an outside lever and an inside lever, wherein each one end of the outside lever and the inside lever is connected to the spindle and wherein the outside lever and the inside lever simultaneously press both sides of a brake disc by the spindle moving the outside lever and the inside lever closer to each other when the spindle rotates; and
    a brake pad assembly that includes at least two outside pads disposed between the outside lever and the brake disc and at least two inside pads disposed between the inside lever and the brake disc, the at least two outside pads and the at least two inside pads being respectively seated in a plurality of pad seat formed on the torque member,
    wherein the outside lever and the inside lever extend circumferentially around the brake disc and the outside and inside levers are aligned to cross each other at a cross point thereof and to be decoupled from each other at the cross point, and
    wherein one outside pad of the at least two outside pads and one inside pad of the at least inside pads are adjacent to the spindle and is disposed between the cross point and the spindle such that, when the outside and inside levers move to the brake disc, the outside lever rotates around a first connection point of the outside lever and the one outside pad and the inside lever rotates around a second connection point of the inside lever and the one inside pad.

7. The actuator-driven brake having the multi-pad of claim 6, wherein a first outside pad contact part and a second outside pad contact part are assembled to be movable to the left and right, at left and right sides of the outside lever, the first outside pad contact part is close to a rear side of the first outside pad, and the second outside pad contact part is close to a rear side of the first outside pad.

8. The actuator-driven brake having the multi-pad of claim 6, wherein a first inside pad contact part and a second inside pad contact part are assembled to be movable to the left and right, at left and right sides of the inside lever, the first inside pad contact part is close to a rear side of the first inside pad, and the second inside pad contact part is close to a rear side of the first inside pad.

9. The actuator-driven brake having the multi-pad of claim 6, wherein the outside pad includes a first outside pad and a second outside pad connected to left and right sides of the outside lever, respectively, the inside pad includes a first inside pad and a second inside pad connected to left and right sides of the inside lever, respectively, the first outside pad and inside pad and the second outside pad and inside pad are arranged opposite each other, respectively, with the brake disc therebetween.

10. The actuator-driven brake having the multi-pad of claim 6, wherein the disc pressing assembly includes an adapter supporting the spindle rotatably on any one of the outside lever and the inside lever.

11. The actuator-driven brake having the multi-pad of claim 6, wherein lever supports moving along movement path grooves formed on the torque member, with ends of the lever supports in the movement path grooves, are formed on the outside lever and the inside lever.

12. The actuator-driven brake having the multi-pad of claim 6, wherein lever return springs are disposed between the outside lever and the inside lever and return the outside lever and the inside lever that have come closer to each other.

13. The actuator-driven brake having the multi-pad of claim 6, wherein in the outside lever, an outside bearing supporting left and right movement of the outside pad contact part is disposed between the outside lever and the outside pad contact part.

14. The actuator-driven brake having the multi-pad of claim 6, wherein in the inside lever, an inside bearing supporting left and right movement of the inside pad contact part is disposed between the inside lever and the inside pad contact part.

15. The actuator-driven brake having the multi-pad of claim 6, wherein in the outside lever, a pad contact return spring returning the outside pad contact part that has moved straight is disposed between the outside lever and the outside pad contact part.

16. The actuator-driven brake having the multi-pad of claim 6, wherein in the inside lever, a pad contact return spring returning the inside pad contact part that has moved straight is disposed between the inside lever and the inside pad contact part.

17. The actuator-driven brake having the multi-pad of claim 8, wherein a rear side of the outside pad is concave, front sides of the pad contact parts facing the outside pad are convex, and a curvature of the rear side of the outside pad is smaller than a curvature of the front sides of the pad contact parts assembled with the outside lever.

18. The actuator-driven brake having the multi-pad of claim 9, wherein a rear side of the inside pad is concave, front sides of the pad contact parts facing the inside pad are convex, and a curvature of the rear side of the inside pad is smaller than a curvature of the front sides of the pad contact parts assembled with the inside lever.

* * * * *